United States Patent [19]

Kato

[11] Patent Number: 4,873,064
[45] Date of Patent: Oct. 10, 1989

[54] POWDER OF COAGULATED SPHERICAL ZIRCONIA PARTICLES AND PROCESS FOR PRODUCING THEM

[75] Inventor: Etsuro Kato, Aichi, Japan

[73] Assignee: Nissan Chemical Industries, Ltd., Tokyo, Japan

[21] Appl. No.: 836,143

[22] Filed: Mar. 4, 1986

[30] Foreign Application Priority Data

Mar. 4, 1985 [JP] Japan .................................. 60-42098

[51] Int. Cl.$^4$ ............................................ C04B 35/48
[52] U.S. Cl. ..................................... 423/85; 423/608; 501/103; 501/104
[58] Field of Search ....................... 501/103, 104, 105; 423/85, 608

[56] References Cited

U.S. PATENT DOCUMENTS 4,543,341 9/1985 Barringer et al. ....................... 501/1
4,719,091 1/1988 Wusirika ............................... 423/82

FOREIGN PATENT DOCUMENTS 58-79818 5/1983 Japan .................................. 423/608
60-36330 2/1985 Japan .................................. 423/608
60-180917 9/1985 Japan .................................. 423/608

Primary Examiner—William R. Dixon, Jr.
Assistant Examiner—Ann Knab
Attorney, Agent, or Firm—Birch, Stewart, Kolasch & Birch

[57] ABSTRACT

Calcined powder of coagulated spherical particles having a secondary coagulated particle size of 0.2 μm to 3 μm, composed of primary particles of less than 500 Å in the crystalline size, and obtained by calcining ultrafine zirconia particles with or without other metal compounds is disclosed. As the ultrafine zirconia particles, coagulated spherical zirconia particles composed of ultrafine monoclinic primary particles of less than 100 Å in the crystalline size, coagulated with each other into a substantially spherical shape with the size of the coagulated particles being in a range from 0.2 μm to 3 μm is preferably used.

14 Claims, 1 Drawing Sheet

POWDER OF COAGULATED SPHERICAL ZIRCONIA PARTICLES AND PROCESS FOR PRODUCING THEM

BACKGROUND OF THE INVENTION

This invention relates to calcined powder of coagulated spherical particles having a secondary coagulated particle size of 0.2 μm to 3 μm, composed of primary particles of less than 500 Å in the crystallite size, and obtained by calcining ultrafine zirconia particles with or without other metal compounds, as well as a process for producing them.

As the performances of fine ceramics have been improved in recent years, the size of the particles used for the starting material has tended to be reduced extremely and the importance of the ultrafine starting particles has gradually been increased also for zirconia ceramics, particularly, partially stabilized zirconia ceramics noted as toughed ceramics. Then, the use of fine particles of submicron size or ultrafine particles of less than about 500 Å has now been started.

However, those fine particles, particularly, ultrafine particles of less than about 500 Å involve serious troubles in view of the production of ceramics at least with respect to the following two points. One of them concerns the production of powder and the other of them arises in obtaining green compacts or forming products from the powder.

Generally, ultrafine particles of less than 500 Å result in firm inter-particle bondings at the drying and calcinating step for the preparation of powder due to the effect of water or the like thereby tending to form irregular lumps, which can not be powderized with ease into a uniform fine particle size again even after pulverization and thus the properties of ultrafine particles are almost lost. Then, it is usually necessary to prevent firm and irregular coagulation by replacing the water content with an expensive alcohol or the like prior to the drying or to employ freeze-drying which, however, complicates the production procedures and results in economical disadvantage (refer to Japanese patent publication No. 25523/1979).

The other drawback is that the powdery ceramic material having an ultrafine particle size gives an extreme difficulty for molding even if firm and irregular coagulation can be prevented, in which the sintering shrinkage is increased, deformations or crackings are liable to be caused and the dimensional accuracy after the sintering is worsened.

The granulating method by the spray drying may be employed as a technical means for improving the uniform and dense packing property in the forming. However, since the use of water degrades the properties of the ultrafine particles as described above, the granulating is carried out after coagulating them through calcination. The coagulated particles obtained in this case lose their properties as the ultrafine particles and become inhomogenous which, after all, renders the inner texture of the green compacts or forming products inhomogenous.

SUMMARY OF THE INVENTION

An object of this invention is to provide calcined powder of coagulated spherical particles having a secondary coagulated particle size of 0.2 μm to 3 μm, composed of primary particles of less than 500 Å in the crystallite size, and obtained by calcining ultrafine zirconia particles with or without other metal compounds.

Another object of this invention is to provide powder of coagulated spherical zirconia particles substantially spherical in the shape, of a coagulated particle size within a range from 0.2 μm to 3 μm, preferably 0.3 μm to 3 μm and having a relatively uniform coagulated particle size, essentially consisting of ultrafine monoclinic primary particles of less than 100 Å in the crystallite size coagulated with each other, which are useful as the starting material for the calcined powder.

A further object of this invention is to provide a process for efficiently and simply producing the powder of coagulated spherical particles as described above.

In the course of extensive studies, the present inventor has found that suspended particles prepared by hydrolyzing an aqueous solution of zirconium salt under heating at a temperature from 90° to 250° C. are coagulated twin secondary particles composed of monoclinic fine primary zirconia particles (including solid solution of impurities such as hafnium rare earth elements, earth metals, etc.) of less than 100 Å in the crystallite size and that the size of the secondary particles ranges from 30 to 2000 Å.

In this process, however, the coagulated particles were hardly grown to greater than 2000 Å even when the conditions were varied. Then, after the succeeding study, the present inventor has further discovered a process capable of obtaining coagulated particles of greater than 2000 Å (0.2 μm) by using those particles of greater than 1000 Å contained in the hydrolyzates from the aqueous solution of zirconium salt as seed crystals, adding water and a zirconium salt further thereto and hydrolyzing them again in an acidic solution under heating at a temperature from 90 to 250° C. thereby growing the secondary particles of zirconia. It has also been found that the coagulated particles thus obtained possessed excellent properties.

The present inventor has also found the following facts. That is, precipitation is caused by adding an acid such as hydrochloric acid or nitric acid to the sol of finely crystalline zirconia particles. For instance, when the hydrochloric acid concentration is increased to higher than 1.5 N, the suspended zirconia particles are coagulated with each other and substantially spherical relatively loose independent coagulated particles from 0.2 μm to 3 μm in size begin to precipitate. When the thus precipitated coagulated particles are kept suspended and heat-treated at a temperature from 90° to 250° C. as they are or further adding a zirconium salt thereto, the particles are grown into firm and stable spherical particles of from 0.2 μm to 3 μm size composed of monoclinic primary particles of less than 100 A in the crystallite size and secondary coagulated particles of greater than 2000 Å can thereby be obtained.

Furthermore, the present inventor has found a process for producing spherical particles of greater than about 2000 Å and having a relatively narrow particle size distribution directly in the aqueous solution by increasing the amount of chlorine ions in the aqueous solution of zirconium salt and have accomplished this invention based on such finding.

The present inventor has also found that the resulting zirconia powder can be calcined solely or in admixture with other metal compound at a temperature lower than 1000° C. The calcined product is readily loosened by a conventional pulverizing method to provide calcined powder having almost the same particle shape, a uniform secondary coagulated particle size and the isolated state of the coagulated particles as those of the starting zirconia coagulated particles, even though the crystallite size may become large to the extent of 500 Å and the crystal form may change, for example, from monoclinic system to tetragonal system upon calcination. The calcined powder is effective as the material of fine ceramics and a sintered product can be obtained by using the calcined powder without granulating and sintering it.

Accordingly, the present invention provides calcined powder of coagulated spherical particles having a secondary coagulated particle size of 0.2 μm to 3 μm, composed of primary particles of less than 500 Å in the crystallite size, and obtained by calcining ultrafine zirconia particles with or without other metal compounds.

In the preferred embodiment of the invention, the ultrafine zirconia particles may preferably be coagulated zirconia particles substantially in a spherical shape having a secondary coagulated particle size within a range from 0.2 μm to 3 μm (2000–30000 Å) and composed of monoclinic primary particles of less than 100 Å in the crystallite size coagulated with each other in orientation.

The present invention also provides the following production processes (I)–(III) for obtaining such powder.

(I) A process for producing powder of coagulated spherical zirconia particles, which comprises:
(a) hydrolyzing an aqueous solution of zirconium salt under heating at a temperature from 90° to 250° C., then separating the coagulated zirconia particles of greater than about 1000 Å into the particle size from coagulated zirconia particles composed of ultrafine monoclinic crystalline primary particles of less than 100 Å in the crystallite size coagulated with each other,
(b) adding a zirconium salt and water to the thus separated coagulated particles to prepare an aqueous suspension,
(c) hydrolyzing the aqueous suspension under heating at a temperature from 90° to 250° C. to grow the particles and increase the secondary particle size, then repeating once or more the procedures of adding a zirconium salt again and hydrolyzing them under heating at a temperature from 90° to 250° C., thereby obtaining coagulated spherical particles having an essentially uniform particle size ranging from 0.2 μm to 3 μm and separating the thus grown particles from the aqueous suspension, and
(d) drying the thus separated particles to obtain the powder.

(II) A process for producing powder of spherical coagulated zirconia particles, which comprises:
(a) adding an acid to a sol of coagulated zirconia particles of greater than about 1000 Å in the coagulated particle size composed of monoclinic ultrafine primary particles of less than 100 Å in the crystallite size coagulated with each other thereby precipitating temporarily coagulated particles containing those of from 0.2 μm to 3 μm in the coagulated particle size,
(b) applying heat treatment to the thus formed precipitating coagulated particles at a temperature from 90° to 250° C. with or without adding a zirconium salt thereby separating spherical particles of from 0.2 μm to 3 μm in the particle size from the aqueous suspension, and
(c) drying the particles separated in the above-mentioned step to obtain the powder.

(III) A process for producing spherical coagulated zirconia particles, which comprises:
(a) hydrolyzing an acidic aqueous solution of water-soluble zirconium salt containing chlorides of one or more of metals selected from the group consisting of aluminum, alkaline earth metals, alkali metals and rare earth elements at a high concentration higher than 4 N in total under heating to a temperature form 90° C. to 250° C., thereby growing spherical particles of from 0.2 μm to 3 μm and separating the thus grown particles from the aqueous suspension, and
(b) repeating, as required, the procedures of adding the thus grown particles to the acidic aqueous solution of the zirconium salt in the step (a) and hydrolyzing them under heating to a temperature from 90° C. to 250° C. thereby separating the grown particles, and
(c) drying the grown particles separated in the step as described above to obtain the powder.

The calcined powder can be prepared by calcining the coagulated zirconia particles with or without other metal compound at a temperature of less than 1000° C. and pulverizing the resulting calcined product.

The process according to this invention can provide ideal powder for use in ceramics comprising substantially spherical isolated coagulated particles finally having optional particle size and distribution within a range from 0.2 μm to 3 μm. Further, the coagulated zirconia particles, which are secondary coagulated particles composed of ultrafine primary particles of less than 0.01 μm (100 Å), have highly excellent properties, for instance, that they are extremely active and excellent in the reactivity and the sintering property, as well as that the chemical composition, particle size of the primary particles and the fine inner texture such as coagulated state can properly be adjusted by calcination, solid state reactions or the like depending on the purpose. Furthermore, the coagulated particles can be obtained in a spherical shape according to this invention with no spray drying and their properties as the fine particles are not lost even after the spray-drying with water.

As described above, this invention enables industrial production of ideal powder for zirconia ceramics substantially in a complete form by a relatively simple method and, accordingly, it is of an excellent value in the field of abrasion agents, cosmetics and emulsions, as well as in the industrial production of fine ceramics.

The above and other objects, features and advantages of the invention will be apparent from the following description.

BRIEF DESCRIPTION OF THE DRAWING

The drawing attached is an electronmicroscopic photograph showing one example of ultrafine zirconia particles.

DETAILED DESCRIPTION OF THE INVENTION

Figure 1:
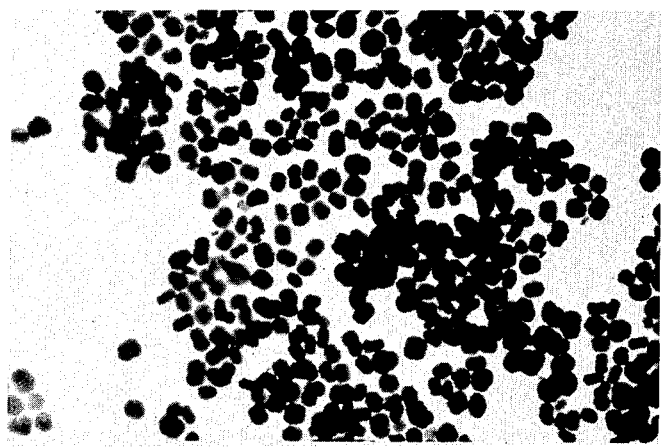

As described above, this invention provides calcined powder of coagulated spherical particles having a secondary coagulated particle size of 0.2 μm to 3 μm, composed of primary particles of less than 500 Å in the crystallite size, and obtained by calcining ultrafine zirconia particles with or without other metal compounds.

In this case, the preferred ultrafine zirconia particles are coagulated spherical zirconia particles composed of monoclinic ultrafine primary particles of less than 100 Å in the crystallite size coagulated with each other, having a substantially spherical shape with the coagulated particles size in a range from 0.2 μm to 3 μm, preferably 0.3 μm to 3 μm. The spherical zirconia particles may contain hafnium, rare earth metals, alkali earth metals, etc. as a solid solution The fine secondary coagulated particles are ideal powder for use in ceramics in that they do not lose their property as the fine particles even after the spray-dry treatment by water, they comprise isolated particles which are already substantially spherical without spray-drying and they are extremely active and excellent in the reactivity and sinterability.

The powder of the coagulated spherical zirconia particles can be obtained by the following first to third processes.

First Process (I)

A process for producing powder of coagulated spherical zirconia particles, which comprises:
(a) hydrolyzing an aqueous solution of zirconium salt under heating at a temperature from 90° to 250° C., then separating powder of coagulated zirconia particles of greater than about 1000 Å in the particle size from coagulated zirconia particles composed of ultrafine monoclinic crystalline primary particles of less than 100 Å in the crystallite size formed by hydrolysis,
(b) adding a zirconium salt and water to the thus separated coagulated particles to prepare an aqueous suspension, and
(c) hydrolyzing the aqueous suspension under heating at a temperature from 90° to 250° C. to grow the secondary particle size, then repeating once or more the procedures of adding a zirconium salt again and hydrolyzing them under heating at a temperature from 90° to 250° C., thereby growing them into spherical particles having an essentially uniform particle size within a range from 0.2 μm to 3 μm, and separating the thus grown particles from the aqueous suspension.

The zirconium salt usable in the steps (a) and (b) can include, for example, zirconium oxychloride, zirconium carbonate, zirconium nitrate and zirconium acetate. The concentration of the zirconium salt in the aqueous solution is preferably from 0.05 to 2 mole/l and, particularly, from 0.1 to 1 mole/l. The temperature for hydrolyzing of the aqueous solution of zirconium salt is, as described above, from 90° to 250° C. and, preferably, from 120° to 200° C. If the temperature is lower than 90° C., too much time is taken for the growing. While on the other hand, if it is higher than 250° C., the primary particle size will become greater to lose the reactivity and bonding will begin to occur between the coagulated secondary particles. The reaction time is from 3 to 40 hours depending on the reaction temperature.

By the hydrolyzing reaction under heating, coagulated zirconia particles composed of ultrafine monoclinic primary particles of less than 100 Å in the crystallite size coagulated with each other can be obtained, and the coagulated particles usually have coagulated particle size ranging from 30 to 2000 Å. In this case, the coagulated particles of less than 1000 Å have larger growing surface area per unit weight and are more liable to be grown while floating in the liquid as the particle size is smaller. However, the particles themselves do not grow to greater than 2000 Å and hinder the growth of readily precipitating relatively coarse coagulated particles. Accordingly, monoclinic coagulated zirconia particles greater than about 1000 Å are necessary. In view of the above, secondary coagulated particles of less than 1000 Å have to be separated. As the separating means, centrifugation, separation by means of separating membrane or the like can be applied.

Then, water and a zirconium salt are added to the thus obtained coagulated zirconia particles greater than about 1000 Å to prepare an aqueous suspension mixture. In this case, the pH value may be lowered to less than 1. The concentration of the zirconium salt is preferably from 0.2 to 2 mole/l and, particularly, from 0.3 to 1 mole/l. Further, the ratio of the coagulated particles of greater than 1000 Å to the total Zr amount is preferably from 1:1000 to 1:3, particularly from 1:100 to 1:6.

In accordance with this invention, an aqueous suspension mixture is hydrolyzed under heating to a temperature from 90° to 250° C. with stirring and the resulting coagulated zirconia particles of greater than about 1000 Å obtained by the separation are used as the seed crystals and grown into 0.2 μm to 3 μm size.

In this case, the particle size can optionally be controlled within a range from 0.2 μm to 3 μm by repeating the procedures of adding the zirconium salt again to the aqueous suspension containing the seed crystals and carrying out the hydrolyzing reaction for the zirconium salt usually about from 1 to 5 times, whereby the powder of coagulated zirconia particles desired in this invention can be obtained.

Second Process (II)

A process for producing powder of coagulated spherical zirconia particles, which comprises:
(a) adding an acid to a sol of coagulated zirconia particles of greater than about 1000 Å in the coagulated particle size composed of monoclinic ultrafine primary particles of less than 100 Å in the crystallite size coagulated with each other thereby precipitating temporarily coagulated particles containing those of from 0.2 μm to 3 μm in the coagulated particle size, and
(b) applying a heat treatment to the thus formed precipitating coagulated particles at a temperature from 90° to 250° C. with or without adding a zirconium salt thereby separating spherical particles of from 0.2 μm to 3 μm in the particle size from the aqueous suspension.

While the production process for the sol of fine crystalline zirconia particles in the step (a) above can be carried out in various methods and a method of hydrolyzing a fluidizing slurry of a zirconium salt and zirconium hydroxide at a temperature from 90 to 250° C. is preferred. In this case, the conditions for the hydrolysis under heating can be the same as those in the step (a) above in the first process.

In accordance with this invention, an acid is added to the sol thereby precipitating the coagulated particles of 0.2 μm to 3 μm. Hydrochloric acid, nitric acid or the like is used as the acid, which is added until the acid concentration of the sol reaches higher than 1.5 N.

While the thus obtained coagulated particles are relatively loosely coagulated, firm and stable coagulated particles of from 0.2 μm to 3 μm size as the object of this invention can be obtained by applying heat treatment at a temperature from 90° to 250° C. In this case, the zirconium salt may be added in the heat treatment step at the concentration of 1/100–½ to the total Zr amount of the step (a). Further, the time for heat treatment is preferably from 4 to 20 hours.

Third Process (III)

A process for producing coagulated spherical zirconia particles, which comprises:

(a) hydrolyzing an acidic aqueous solution of a water-soluble zirconium salt containing chlorides of one or more metals selected from the group consisting of aluminum, alkaline earth metals, alkali metals and rare earth elements at a high concentration higher than 4 N in total under heating to a temperature from 90° C. to 250° C., thereby growing into spherical particles of from 0.2 μm to 3 μm composed of monoclinic ultrafine primary particles of less than 100 Å in the crystallite size coagulated with each other, and separating the thus grown particles from the aqueous suspension, and (b) repeating the procedures, as required, of adding the thus grown particles to the acidic aqueous solution of the zirconium salt in the step (a) and hydrolyzing them under heating to a temperature from 90° C. to 250° C. thereby separating the grown particles.

In this case, while there are no particular restrictions to the concentration of the zirconium salt in the step (a) above, it is from 0.05 to 2 mole/l and, particularly, from 0.1 to 0.5 mole/l converted as Zr in the case where no coagulated particles are added as the seed crystals. In the case of adding the coagulated particles as the seed crystals, the concentration is adjusted by calculating the amount required for growing the particles into a desired particle size with respect to the particle size and the number of the coagulated particles, which is usually from 1/6 to 1/100 as Zr to the seed crystals. Further, the chloride of aluminum, alkaline earth metals, alkali metals and rare earth metals can include, for example, aluminum chloride, magnesium chloride, sodium chloride, potassium chloride, calcium chloride, yttrium chloride, ytteribium chloride and cerium chloride. It is considered that the metal chloride functions to hinder the formation of new nuclei in the liquid. If the concentration of the chloride in the aqueous solution of the zirconium salt is lower than 4 N, the function thereof goes lower to make the particle size distribution of the product broader. The concentration is, therefore, at least 4 N and most preferably 6 N. According to an experiment made by the present inventor, if the temperature for the hydrolysis under heating is lower than 90° C., the time required therefor is extremely long. While on the other hand, if it goes higher than 250° C., economical advantage is gradually worsened. The optimum temperature ranges from 120° to 200° C. A preferred range for the hydrolyzing time is from 1 to 100 hours and, particularly, from 4 to 40 hours.

Also in this production process, particle size can be controlled by adding a new zirconium salt to the thus obtained secondary coagulated particles as the seed crystals. In this case, the particle size can be controlled better than in the process (I)–(II).

According to the third process, no classification by the precipitating separation as in the first process for narrowing the particle size distribution is required, but uniform and substantially spherical coagulated particles of a relatively narrow particle size distribution can be formed directly in the aqueous solution That is, based on the detailed study as described above, the present inventor has found, that suspended particles formed by hydrolyzing an aqueous solution of zirconium salt under heating are coagulated twin secondary particles composed of monoclinic fine zirconia crystals (including solid solution of impurities such as hafnium, etc.) of less than 100 Å in the crystallite size and the size of the secondary particles is within a range from 30 to 2000 Å. However, since new nuclei are generally produced in the solution successively and the product has a broad particle size distribution, classification by centrifugation or the like has been necessary in order to obtain those with uniform particle size. Accordingly, it has been difficult to directly produce only the uniform coagulated spherical particles of a narrow particle size distribution. However, according to the third process, it is possible to form coagulated spherical particles of greater than about 2000 Å in the particle size with a relatively narrow particle size distribution directly in the aqueous solution by the treatment only once. Further, by suspending the coagulated particles and hydrolyzing the water soluble zirconium salt under heating with the conditions as described above, new crystal nuclei are less formed in the solution and hydrolysis under heating occurs exclusively on the suspended coagulated particles as the seed crystals, whereby the coagulated suspended particles continue to grow uniformly. Accordingly, substantially spherical coarse coagulated particles of relatively uniform size with a desired particle size of greater than 2000 Å can be produced simultaneously in a great amount without requiring precipitating separation.

As the separating method for the secondary coagulated particles of from 0.2 μm to 3 μm of the particle size in the aqueous suspension in the first to third production processes, filtration, decantation, centrifugal separation and separation with a separating membrane can be applied as the separation method for the coagulated secondary particles of 0.2 μm to 3 μm in the aqueous suspension.

All of the coagulated particles obtained in the process according to this invention are formed in the state of an aqueous liquid suspension system and the prominent feature thereof resides in that the coagulated particles comprise ultrafine crystalline primary particles of less than 100 Å and are obtained as isolated and substantially spherical coagulated particles of greater than 2000 Å. They are easily classified for the particle size due to the precipitating or the centrifugal method, do not lose their properties in the usual heating and drying and provide powder comprising easily separating isolated coagulated particles after drying. The process can just be referred to as the micro granulation process in water. Such granulation within the minute range from 0.2 μm to 3 μm has not been practiced at all in the prior art. Furthermore, the coagulated particles obtained by the process according to this invention also have a feature in the ease of the calcination treatment. That is, the crystallite size, crystal form, chemical composition, coagulated state and the like of the primary particles in the substantially spherical coagulated particles with a relatively narrow particle size distribution can be varied by subjecting them to heat treatment or calcination at an appropriate temperature lower than 1000° C., solely or in admixture with other metal compounds.

More detailedly, the calcined powder can be prepared by calcining the ultrafine zirconia particles solely or in admixture with other metal compounds at a temperature of less than 100° C. and pulverizing the calcined product. Since the bonding between the coagulated particles usually occurring during calcination at a temperature lower than 1000° C. is relatively weaker as compared with that in the internal texture, the calcined products are readily loosened and the shape, the uniform particle size, the isolated state of the coagulated particles are scarcely worsened. While the calcination takes place at a temperature lower than 1000° C., the lower limit for the temperature is preferably 400° C. Other metal compounds in admixture with the coagulated zirconia particles can include, for example, salts, oxides, hydroxides and the likes of rare earth elements such as yttrium, cerium and ytteribium, alkali earth metals such as magnesium and calcium, and aluminum. The amount of the other metal compounds may preferably be less than 8 mole % converted as the oxide to zirconia. It should be noted that the calcined particles may have less than 500 Å of the crystallite size because the crystallite size of the starting ultrafine zirconia particles may become greater upon calcination. The calcined particle may also have various crystal forms including tetragonal system.

The sintered product can be obtained by using the calcined powder with the conventional method.

This invention will now be described more specifically while referring to examples, although this invention is not restricted to the examples.

EXAMPLE 1

About 10 g of a zirconyl chloride reagent ($ZrOCl_2.8H_2O$) were dissolved in about 60 ml of distilled water to prepare a solution at about 0.5 mol/liter. About 60 ml of the solution were hydrolyzed under heating at 150° C. while stirring in a tightly closed vessel for 8 hours. The aqueous suspension thus obtained contained secondary particles in which ultrafine monoclinic primary crystals with a crystallite size of about 40 Å under X-ray diffractometry observation were coagulated in orientation and fine coagulated particles with less than 1000 Å particle size contained therein were separated by a centrifugator. A portion of the coagulated particles of greater than about 1000 Å particle size was used as seed crystals, which were mixed with about 10 g of zirconyl chloride to prepare about 60 ml of an aqueous suspension. The ratio of the seed crystals to Zr in the solution converted as Zr was about ⅓. When the aqueous suspension was hydrolyzed under heating at 150° C. for 8 hours while stirring in a tightly closed vessel again, relatively uniform coagulated particles substantially spherical in the shape with about 4000 Å in size were observed under electron microscope, although the crystallite size under X-ray observation was about 40 Å which was substantially the same as the initial size. Then, the same procedures as described above were repeated using the coagulated particles of about 4000 Å in size as the seed crystals and most of them could be grown into substantially spherical coagulated particles of about 10000 Å in size at the fourth procedures.

EXAMPLE 2

From the above aqueous suspension of the monoclinic coagulated zirconia particles obtained by Example 1, coagulated monoclinic zirconia particles corresponding to about 5000±500 Å in particle size were separated and recovered by a centrifugator, to which yttrium nitrate corresponding to 6 mol % of zirconia was added and mixed well and then calcinated at 800° C. for one hour. The calcination products were slightly coagulated but loosened easily in a mortar. The powder thus obtained was tetragonal solid solution of about 150 Å in the crystallite size under X-ray observation and no free $Y_2O_3$ were recognized. 0.3% by weight of Cellosol (liquid suspension of stearic acid) were added as a lubricant to the powder, which was then press-molded directly under a pressure of 2 t/cm³ without granulating procedure and then baked at 1350° C. for one hour. Sintering products of a density corresponding to about 98% of the theoretical value was obtained. The linear sintering shrinkage was about 15% showing that the shrinkage was extremely small for the readily sinterable powder of this kind and the packing property upon forming was extremely excellent.

EXAMPLE 3

From the above aqueous suspension of the monoclinic coagulated zirconia particles obtained by Example 1, coagulated monoclinic zirconia particles corresponding to about 5000±500 Å in particle size were separated and recovered by a centrifugator, to which magnesium chloride corresponding to 8 mol % of zirconia was added and mixed well and then calcinated at 800° C. for on hour. The calcination products were slightly coagulated but loosened easily in a mortar. The powder thus obtained did not have any free MgO therein.

EXAMPLE 4

About 97 g of a zirconyl chloride reagent were dissolved in about 500 ml of distilled water, to which 1:1 aqueous ammonia was added in a sufficient amount to prepare precipitates of zirconium hydroxide. 39 g of zirconyl chloride reagent were added to the hydrous cakes obtained by filtering the precipitates of zirconium hydroxide under vacuum, and then stirred to prepare a flowing slurry. The slurry was maintained at 97° C. for about 40 hours, to obtain a sol comprising secondary coagulated particles of about 1000 Å in size composed of primary particles of ultrafine monoclinic zirconia crystals of about 30 Å in crystallite size under X-ray diffractometry observation coagulated with each other in orientation (about 40 Å also under electronic microscope observation). When 12 N hydrochloric acid was dropped to the sol, precipitating separation occurred at a hydrochloric concentration of about 2 N. According to the optical microscope observation, the precipitating products were coagulated spherical particles of about 1 μm (10000 Å), but they were weak in the coagulation and could not be formed into dry particles as they were. When a small amount of zirconyl chloride (at 1/10 Zr ratio) was added to the precipitation products and subjected to heat treatment at 150° C. for 8 hours while stirring in a tightly closed vessel, the crystallite size was increased only slightly (about 35 Å) under X-ray observation, while the secondary coagulated particles were firm and stable of about 1 μm in size and gave fine powder upon drying not agglomerating to each other between the coagulated particles.

The reactivity and the sintering property of the thus obtained powdery particles were substantially the same as the results of the powdery particles obtained in Example 2.

EXAMPLE 5

About 10 g of a zirconyl chloride reagent ($ZrOCl_2.8H_2O$) were dissolved in about 150 ml of distilled water to prepare an aqueous solution at about 0.2 mol/liter, to which about 40 g of $AlCl_3$ (the concentration dissolved in 150 ml corresponding to 2 mol/l) were further added to prepare a solution. About one-half amount of the solution was applied with heat treatment at 150° C. for 24 hours in a tightly closed vessel. The hydrolysis was substantially completed by the treatment and the soluble zirconium salt scarcely remained in the solution. According to the X-ray diffractometry, the particles deposited upon hydrolysis comprised ultrafine particles having crystal lattice of monoclinic zirconia with the crystallite size of about 40 Å. According to the observation of electron microscope, they were substantially spherical coagulated particles of substantially uniform size of about 3500 Å with an extremely narrow particle size distribution, as shown in the drawing.

EXAMPLE 6

The deposited coagulated particles obtained in Example 5 were separated from the mother liquid, which were added to the residue of the aqueous solution containing $ZrOCl_2$ and $AlCl_3$ by 0.2 mol/l and 2 mol/l respectively prepared at the first stage in Example 5 and applied with heat treatment at 150° C. for 24 hours while stirring in a tightly closed vessel. Although the particles precipitated upon hydrolysis were substantially identical with those in Example 5 under X-ray observation, the coagulated particles were spherical and grown into 4500 Å under the electron microscopic observation.

EXAMPLE 7

The same procedure as Example 5 was repeated except that 3 mol/l of $CaCl_2$ was used instead of 2 mol/l of $AlCl_3$.

The obtained coagulated zirconia particles were substantially spherical particles of substantially uniform size of about 3000 Å. The reactivity and the sintering property of the particles were substantially the same as the results of the particles obtained in Example 2.

EXAMPLE 8

The same procedure as Example 5 was repeated except that 3 mol/l of NaCl was used instead of 2 mol/l of $AlCl_3$.

The obtained coagulated zirconia particles were substantially spherical particles of substantially uniform size of about 2500 Å. The reactivity and the sintering property of the particles were substantially the same as the results of the particles obtained in Example 2.

EXAMPLE 9

The same procedure as Example 5 was repeated except that 3 mol/l of KCl was used instead of 2 mol/l of $AlCl_3$.

The obtained coagulated zirconia particles were substantially spherical particles of substantially uniform size of about 2500 Å. The reactivity and the sintering property of the particles were substantially the same as the results of the particles obtained in Example 2.

What is claimed is:

1. Powder of coagulated spherical particles having a uniform secondary coagulated particle size of 0.2 μm to 3 μm composed or primary particles of less than 500 Å in the crystallite size, and obtained by calcining ultrafine, zirconia particles with or without other metal compounds, said ultrafine zirconia particles being coagulated spherical zirconia particles having a coagulated particle size within a range from 0.2 μm to 3 μm and composed of monoclinic primary particles of less than 100 Å in the crystallite size coagulated with each other.

2. The powder of coagulated spherical particles according to claim 1, which contains another metal compound selected from the group consisting of salts, hydroxides and oxides of rare earth elements, alkaline earth metals and aluminum.

3. A process for producing calcined powder of coagulated spherical particles having a uniform secondary coagulated particle size of 0.2 μm to 3 μm and composed of primary particles of less than 500 Å in the crystallite size comprising:
  (a) hydrolyzing an aqueous solution of a zirconia salt under heating at a temperature from 90° to 250° C. and separating coagulated zirconia particles of greater than about 1000 Å in coagulated particle size from coagulated zirconia particles composed of ultrafine monoclinic primary particles of less than 100 Å in the crystallite size coagulated with each other prepared by the hydrolysis;
  (b) adding a zirconium salt and water to the thus separated coagulated particles to prepare an aqueous suspension having a pH lower than 1;
  (c) hydrolyzing the aqueous suspension under heating at a temperature from 90° to 250° C. to grow the particles and increase the particle size and thereafter, repeating once or more the procedures of adding the zirconium salt and applying hydrolysis under heating at a temperature from 90° to 250° C., thereby growing the particles into spherical particles of essentially uniform particle size within a range from 0.2 μm to 3 μm and separating the thus grown particles from the aqueous suspension;
  (d) drying the particles separated from the aqueous suspension to obtain a powder of ultrafine zirconia particles; and
  (e) calcining said ultrafine zirconia particles with or without other metal compounds at a temperature of less than 1000° C., and pulverizing the obtained calcined product.

4. A process for producing calcined powder of coagulated spherical particles having a uniform secondary coagulated particle size of 0.2 μm to 3 μm composed of primary particles of less than 500 Å in the crystallite size comprising:
  (a) adding an acid to a sol of coagulated zirconia particles of greater than about 1000 Å in the coagulated particle size composed of ultrafine monoclinic primary particles of less than 100 Å in the crystallite size coagulated with each other so that the acid concentration of the sol reaches higher than 1.5 N to precipitate temporarily coagulated particles containing those of from 0.2 μm to 3 μm in the coagulated particle size;
  (b) applying heat treatment at a temperature from 90° to 250° C. with or without adding a zirconium salt to the thus formed precipitated coagulated particles thereby separating spherical particles of from 0.2 μm to 3 μm in the particle size from the aqueous suspension;
  (c) drying the particles thus separated in the above step to obtain a powder of ultrafine zirconia particles; and
  (d) calcining ultrafine zirconia particles with or without other metal compounds at a temperature of less than 1000° C., and pulverizing the obtained calcined product.

5. A process for producing calcined powder of coagulated spherical particles having a uniform secondary coagulated particle size of 0.2 μm to 3 μm composed of primary particles of less than 500 Å in the crystallite size comprising:

(a) hydrolyzing an acidic aqueous solution of a water soluble zirconium salt containing chlorides of one or more metals selected from the group consisting of aluminum, alkaline earth metals, alkali metals and rare earth elements at a high concentration of greater than 4 N in total under heating at a temperature from 90° C. to 250° C., thereby growing spherical particles from 0.2 μm to 3 μm and separating the thus grown particles from the aqueous suspension;

(b) drying the grown particles separated in said step to obtain a powder containing ultrafine zirconia particles; and (c) calcining said ultrafine zirconia particles with or without other metal compounds at a temperature of less than 1000° C., and pulverizing the obtained calcined product.

6. The process of claim 3, 4 or 5, wherein said zirconium salt is zirconium oxychloride, zirconium carbonate, zirconium nitrate or zirconium acetate.

7. The process of claim 3, 4 or 5, wherein the concentration of said zirconium salt in said aqueous solution is 0.05 to 2 mole/liter.

8. The process of claim 3 wherein the concentration of said zirconium salt in step (b) is 0.2 to 2 mole/liter.

9. A process for producing calcined powder of coagulated spherical particles having a uniform secondary coagulated particle size of 0.2 μm to 3 μm and composed of primary particles of less than 500 Å in the crystallite size comprising:

(a) hydrolyzing a aqueous solution of a zirconium salt under heating at a temperature from 90° to 250° C. and separating coagulated zirconia particles of greater than about 1000 Å in coagulated particle size from coagulated zirconia particles composed of ultrafine monoclinic primary particles of less than 100 Å in the crystallite size coagulated with each other prepared by the hydrolysis;

(b) adding a zirconium salt and water to the thus separated coagulated particles to prepare an aqueous suspension having a pH lower than 1;

(c) hydrolyzing the aqueous suspension under heating at a temperature from 90° to 250° C. to grow the particles and increase the particle size, thereby growing the particles into spherical particles of essentially uniform particle size within a range from 0.2 μm to 3 μm and separating the thus grown particles from the aqueous suspension;

(d) drying the particles separated from the aqueous suspension to obtain a powder of ultrafine zirconia particles; and (e) calcining said ultrafine zirconia particles with or without other metal compounds and pulverizing the obtained calcined product.

10. A process for producing calcined powder of coagulated spherical particles having a uniform secondary coagulated particle size of 0.2 μm to 3 μm composed of primary particles of less than 500 Å in the crystallite size comprising:

(a) hydrolyzing and heating an acidic aqueous solution of a water soluble zirconium salt containing chlorides of one or more metals selected from the group consisting of aluminum, alkaline earth metals, alkali metals and rare earth elements at a high concentration of greater than 4 N under conditions which hinder the formation of new nuclei in the aqueous solution, thereby growing spherical particles having a uniform secondary coagulated particle size from 0.2 μm to 3 μm and separating the thus grown particles from the aqueous suspension;

(b) drying the grown particles separated in said step to obtain a powder containing ultrafine zirconia particles; and (c) calcining said ultrafine zirconia particles with or without other metal compounds and pulverizing the obtained calcined product.

11. The process of claim 10, wherein said temperature is from 120° to 200° C.

12. The process of claim 10, wherein said coagulated spherical particles are composed of ultrafine crystalline primary particles of less than 100 Å.

13. A powder of spherical particles having a uniform secondary coagulated particle size produced by the process of claim 3, 4, 5, 8, 9, 10, 11 or 12.

14. The process of claim 5, which further comprises the steps of repeating the procedures of adding the grown particles thus obtained to the acidic aqueous solution of the zirconium salt in the step (a) and hydrolyzing the crystals under heating at a temperature from 90° C. to 250° C. thereby separating grown particles.

* * * * *